United States Patent
Marsch et al.

(10) Patent No.: US 11,105,919 B2
(45) Date of Patent: Aug. 31, 2021

(54) VEHICLE RADAR FOR ENVIRONMENTAL DETECTION

(71) Applicant: VEONEER SWEDEN AB, Vargarda (SE)

(72) Inventors: Sebastian Marsch, Schweinfurt (DE); Yi Zhou, Gröbenzell (DE)

(73) Assignee: VEONEER SWEDEN AB, Vargarda (SE)

( * ) Notice: Subject to any disclaimer, the term of this patent is extended or adjusted under 35 U.S.C. 154(b) by 264 days.

(21) Appl. No.: 16/313,767

(22) PCT Filed: Jun. 29, 2017

(86) PCT No.: PCT/EP2017/066152
§ 371 (c)(1),
(2) Date: Dec. 27, 2018

(87) PCT Pub. No.: WO2018/002233
PCT Pub. Date: Jan. 4, 2018

(65) Prior Publication Data
US 2019/0170870 A1 Jun. 6, 2019

(30) Foreign Application Priority Data
Jul. 1, 2016 (EP) .................................... 16177581

(51) Int. Cl.
*G01S 13/931* (2020.01)
*G01S 13/90* (2006.01)
(Continued)

(52) U.S. Cl.
CPC ............ *G01S 13/931* (2013.01); *G01S 13/34* (2013.01); *G01S 13/343* (2013.01);
(Continued)

(58) Field of Classification Search
CPC ...... G01S 13/34; G01S 13/343; G01S 13/345; G01S 13/931
See application file for complete search history.

(56) References Cited

U.S. PATENT DOCUMENTS 9,594,159 B2 * 3/2017 Wang .................. G01S 7/414
10,627,480 B2 * 4/2020 Nayyar ................ G01S 13/931
(Continued)

FOREIGN PATENT DOCUMENTS

| DE | 10 2014 218 092 A1 | 3/2016 |
|---|---|---|
| EP | 2 881 754 A1 | 6/2015 |
| WO | WO 2015/078682 A1 | 6/2015 |

OTHER PUBLICATIONS

International Search Report and Written Opinion of PCT/EP2017/066152 dated Oct. 5, 2017.

*Primary Examiner* — Peter M Bythrow
(74) *Attorney, Agent, or Firm* — Dickinson Wright PLLC

(57) ABSTRACT

A vehicle FMCW Doppler radar system (3) and related method using transmitter arrangement (4), a receiver arrangement (7) and at least one control unit (15). The radar system (3) is arranged to transmit signals (11), to receive reflected signals (12), and to obtain a plurality of measure results from the received reflected signals (12) along a main field of view (10) during at least two radar cycles where each radar cycle including a plurality of FMCW ramps. For each radar cycle, the control unit (15) is arranged to form a spectrum density map (30) from measuring points (14) along the main field of view (10), where each measure result results in a measuring point (14). The control unit (15) is arranged to combine at least two spectrum density maps to form a combined spectrum density map.

14 Claims, 6 Drawing Sheets

(51) Int. Cl.
*G01S 13/34* (2006.01)
*G01S 7/35* (2006.01)
*G01S 13/02* (2006.01)

(52) U.S. Cl.
CPC ..... *G01S 13/9017* (2013.01); *G01S 2007/356* (2013.01); *G01S 2013/0263* (2013.01); *G01S 2013/9314* (2013.01); *G01S 2013/93274* (2020.01)

(56) References Cited

U.S. PATENT DOCUMENTS

| | | | |
|---|---|---|---|
| 2007/0152870 A1* | 7/2007 | Woodington | G01S 13/528 342/70 |
| 2009/0085800 A1* | 4/2009 | Alland | G01S 13/931 342/25 R |
| 2016/0018511 A1* | 1/2016 | Nayyar | G01S 13/878 342/27 |
| 2016/0084941 A1* | 3/2016 | Arage | G01S 13/584 342/91 |
| 2016/0084943 A1* | 3/2016 | Arage | G01S 13/42 342/102 |
| 2016/0187464 A1* | 6/2016 | Ginsburg | G01S 7/4008 342/168 |
| 2016/0259048 A1* | 9/2016 | Cornic | G01S 13/343 |
| 2018/0136324 A1* | 5/2018 | Klotzbuecher | G01S 13/343 |
| 2018/0172813 A1* | 6/2018 | Rao | G01S 13/343 |

* cited by examiner

VEHICLE RADAR FOR ENVIRONMENTAL DETECTION

CROSS-REFERENCE TO RELATED APPLICATIONS

This application is a 35 U.S.C. § 371 national phase of PCT International Application No. PCT/EP2017/066152, filed Jun. 29, 2017, which claims the benefit of priority under 35 U.S.C. § 119 to European Patent Application No. 16177581.2, filed Jul. 1, 2016, the contents of which are incorporated herein by reference in their entirety.

FIELD OF THE INVENTION

The present disclosure relates to a vehicle Doppler radar system including a transmitter arrangement, a receiver arrangement and at least one control unit. The radar system is arranged to be mounted in a vehicle having a forward running direction. The transmitter arrangement includes a signal generator and a transmitter antenna arrangement arranged for transmitting signals. The receiver includes a receiver and a receiver antenna arrangement arranged for receiving reflected signals.

BACKGROUND

Today, one or more radar systems are often used in vehicles in order to detect obstacles in the surroundings. Such a radar system is usually arranged to distinguish or resolve single targets from the surroundings by using a Doppler effect in a previously well-known manner.

Many vehicle radar systems include radar transceivers that are arranged for generating radar signals that are transmitted, reflected and received by means of appropriate antennas as part of the radar system. The radar signals may for example be in the form of FMCW (Frequency Modulated Continuous Wave) signals.

Apart from use for collision detector arrangements, radars may for example be used for detecting available space for parking spots, assisting when parking a vehicle as well as for all assisted driving such as more or less completely automated driving assistance.

When detecting the surroundings, such as for example available space for parking spots, an estimation of the dimensions of a possible parking spot is desired, in particular its depth and length. An accurate detection of the surroundings is also desired for more or less completely automated driving assistance.

Such a radar system is described in EP 2881754, where a radar transceiver is used to acquire measuring points, where a control unit is arranged to subject each measuring point to a probability analysis to determine the probability that a certain measuring point represents the presence of an object.

However, an improved approach is desired.

An objective of the present disclosure is thus to provide an improved vehicle radar for environmental detection.

The above-referenced objective is achieved by an embodiment of the present invention including a vehicle FMCW (Frequency Modulated Continuous Wave) Doppler radar system including a transmitter arrangement, a receiver arrangement and at least one control unit. The radar system is arranged to be mounted in a vehicle having a forward running direction. The transmitter arrangement includes a transmitter antenna arrangement arranged for transmitting signals, and the receiver arrangement includes a receiver antenna arrangement arranged for receiving reflected signals. The radar system is arranged to obtain a plurality of measure results from the received reflected signals along a main field of view during at least two radar cycles where each radar cycle G includes a plurality of FMCW ramps. For each radar cycle, the control unit is arranged to form a spectrum density map from measuring points along the main field of view, where each measure result results in a measuring point. The control unit is arranged to combine at least two spectrum density maps to form a combined spectrum density map.

The above-referenced objective is also achieved by an embodiment of the present invention in the form of a method for a vehicle Doppler radar system that is used in a vehicle having a forward running direction. The method includes the steps of:

Transmitting signals.

Receiving reflected signals.

Obtaining a plurality of measure results from the received reflected signals along a main field of view during at least two radar cycles.

For each radar cycle, forming a spectrum density map from measuring points along the main field of view, where each measure result results in a measuring point.

Combining at least two spectrum density maps to form a combined spectrum density map.

According to an example embodiment, the spectrum density map includes range and angle spectrum.

According to another example embodiment of the present invention, the control unit is arranged to calculate the spectrum density map by means of either data from a range FFT (Fast Fourier Transform) function or a Doppler FFT function, where the radar system includes a DSP (Digital Signal Processor) function that is arranged to perform the FFT functions.

According to another example embodiment of the present invention, the control unit is arranged to determine a phase difference between adjacent FMCW ramps for each measuring point, to determine a measurement vector including direction and magnitude for each measuring point, and to perform a rotation of each measurement vector with the phase difference such that the rotated measurement vectors that correspond to stationary measuring points add in phase.

According to another example, the receiver antenna arrangement includes at least two receiver antenna devices with corresponding receive channels. The control unit is arranged to combine the receive channels of the receiver antenna devices by means of beamforming, where each wavefront corresponding to the received reflected signals reach adjacent receiver antenna devices with a delay time that corresponds to a certain delay distance and a certain delay phase that depends on a direction of arrival (DOA) angle. The control unit is arranged to compensate for the delay phase by means of a compensating rotation of a determined complex signal for each antenna device.

Other examples are disclosed in the this description.

A number of advantages are obtained by means of the present disclosure. Mainly, a vehicle radar system is disclosed where the risk for detection errors such as false detection is minimized.

BRIEF DESCRIPTION OF THE DRAWINGS

The present disclosure will now be described more in detail with reference to the appended drawings, where.

DETAILED DESCRIPTION

Figure 1:
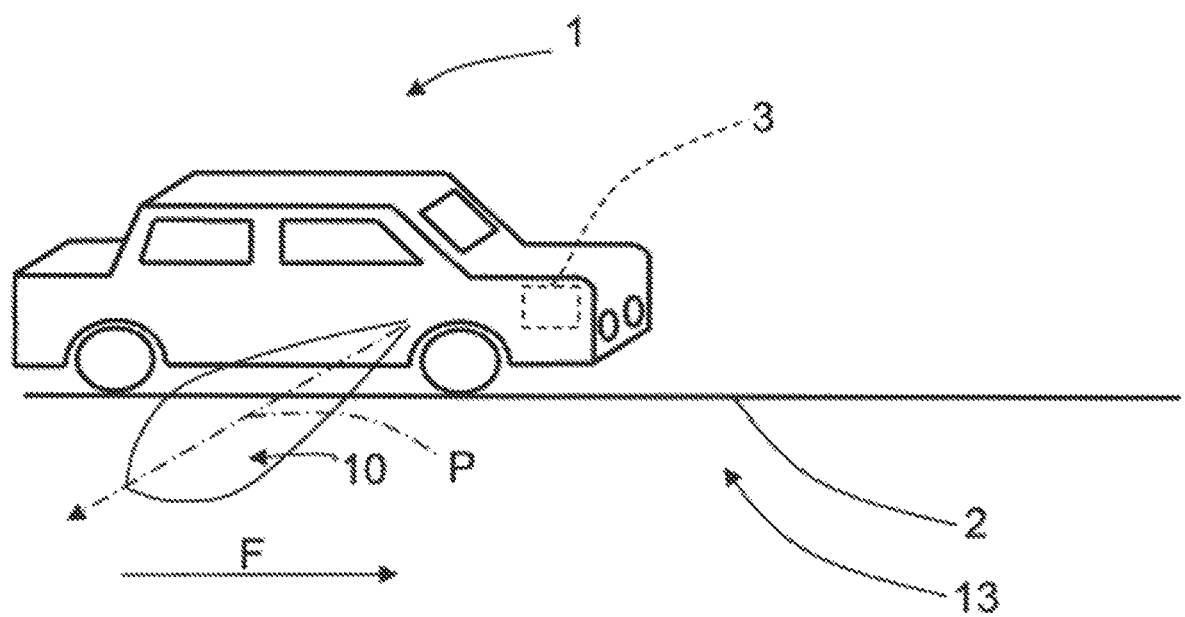
FIG. 1 shows a schematic side view of a vehicle.

FIG. 1 schematically shows a side view a vehicle 1 that runs on a road 2 in a forward direction F with a certain vehicle velocity $v_F$, where the vehicle 1 includes a vehicle radar system 3 which is arranged to distinguish and/or resolve single targets from the surroundings by using a Doppler effect in a previously well-known manner, i.e. successive echoes from the same point are superimposed and identified by means of Doppler effect. The radar system 3 is in this example positioned on the right-hand side of the vehicle, and has a main field of view 10 that is aimed in a pointing direction P that extends more or less perpendicular to the forward direction F.

Figure 2:
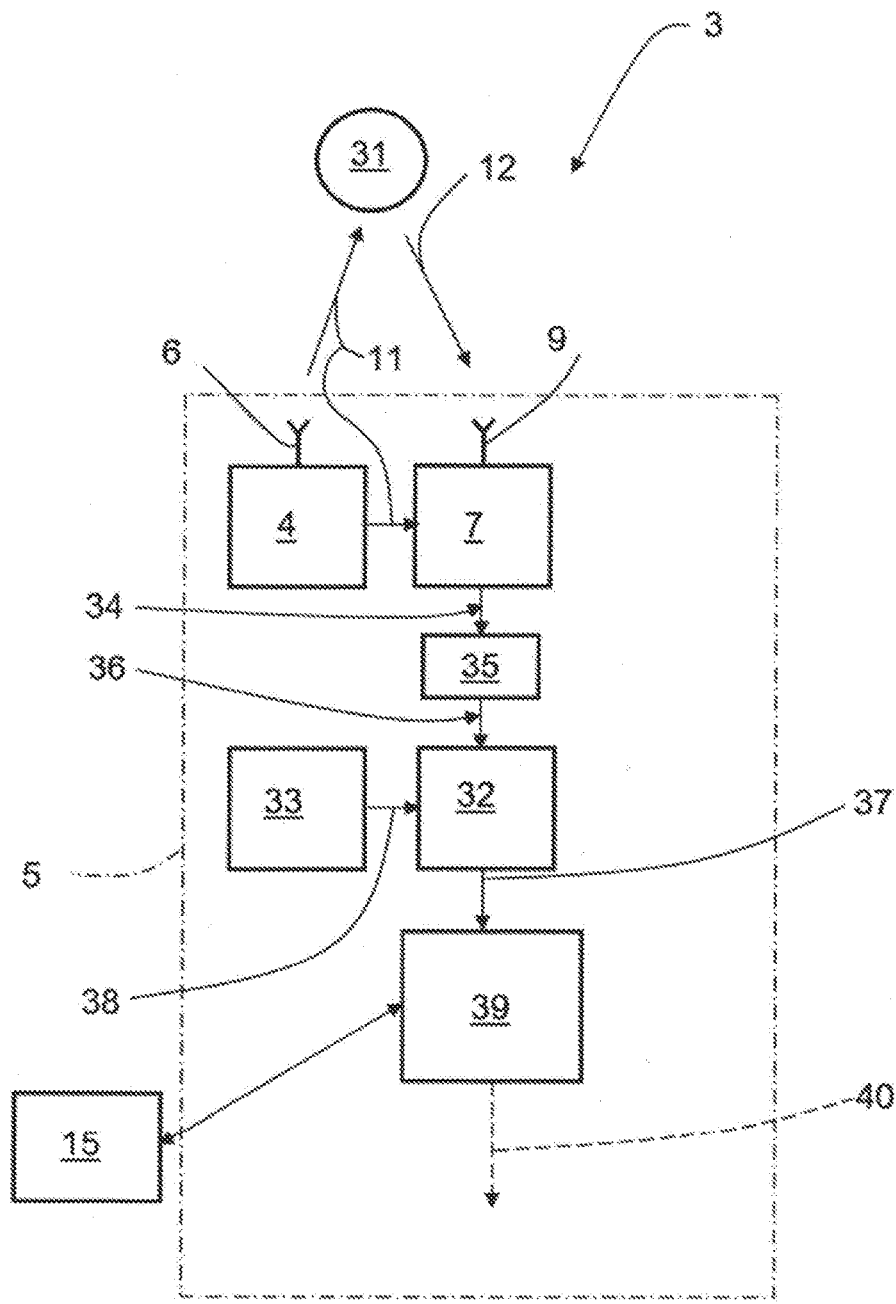
FIG. 2 shows a simplified schematic view of a radar system according to the present disclosure.

With reference also to FIG. 2, the radar system 3 includes a transceiver arrangement 5 that is arranged for generating and transmitting sweep signals in the form of FMCW (Frequency Modulated Continuous Wave) chirp signals 11, and to receive reflected signals 12, where the transmitted chirp signals 11 have been reflected by an object 31.

The transceiver arrangement 5 includes a transmitter arrangement 4 with a transmit antenna arrangement 6, a receiver arrangement 7 with a receiver antenna arrangement 9, an Analog to Digital Converter (ADC) arrangement 32 and sampling and timing arrangement 33.

More in detail, with reference to FIG. 3, there is transmitted signal 11, constituting a so-called chirp signal that is in the form of a continuous sinusoid where the frequency varies from a first frequency $f_{start}$ to a second frequency $f_{stop}$ over the course of a ramp, where the magnitude of the first frequency $f_{start}$ falls below the magnitude of the second frequency $f_{stop}$.

The chirp signal 11 includes repeating cycles of a plurality N of frequency ramps r where a radar cycle for the chirp signal 4 lasts for a certain radar cycle time $t_c$, each ramp lasting a certain ramp time $t_r$ and where there is a certain delay time $t_D$ between adjacent ramps r. Each ramp r has a period time T that equals a sum of the ramp time $t_r$ and the delay time $t_D$. The delay time to may be essentially zero.

With renewed reference to FIG. 2, the reflected signals 12 are received by the receiver arrangement 7 via the receiver antenna arrangement 9. The received signals 12, thus constituted by reflected radar echoes, are then mixed with the transmitted chirp signals 11 in the receiver arrangement 9. This may be a single channel mixer, or a two channel mixer including both in-phase and quadrature components. In this way, an IF (Intermediate Frequency) signal 34 is acquired, which may be real or, in the case of quadrature mixer, imaginary. The IF signal 34 is filtered in an IF filter 35 such that a filtered IF signal 36 is acquired.

The frequency of the filtered IF signal 36 relates to the target distance and is transferred to the corresponding ADC arrangement 32, where the filtered IF signal 36 is sampled at a certain predetermined sampling frequency $f_s$ and converted to a digital IF signal 37 including sample points in a previously known manner, the sampling frequency $f_s$ being provided in the form of a sampling and timing signal 38 produced by the sampling and timing arrangement 33 that is connected to the ADC arrangement 32.

The ADC arrangement 32 is connected to a DSP arrangement 39 that is adapted for radar signal by means of well-known FFT (Fast Fourier Transform) processing of an FMCW radar signal to extract objects within the field of view 10. For such processing normally a range FFT function is arranged to convert the filtered digital IF signal 36 to a range domain, and a Doppler FFT function is arranged to combine the results from successive chirp signal ramps, or other suitable Doppler radar cycles, into the Doppler domain. This results in an output 40 including Range-Doppler matrices that are transferred for further processing, which is not further discussed here, many examples of such further processing being well-known in the art.

The radar system 3 also includes a control unit 15. The control unit 15 should be regarded as a control unit arrangement that is in the form of one unit or several units that either co-operate or handle different tasks more or less independently. In the case of several units, these may be placed adjacent to each other, or in a distributed manner. The control unit is here shown connected to the DSP arrangement 39, of course this is not necessary; the control unit 15 may be connected to several components and/or other control units.

With reference also to FIG. 1, when in use, the transmitter antenna arrangement 6 sends a signal laterally in the pointing direction P when the vehicle 1 runs past a parking 13, the radar system 3 having the certain field of view 10 that passes along the parking 13. The radar system 3 then receives echoes of the transmitted signals 11 by means of the receiver antenna arrangement 8 where the transmitted signals 11 have been reflected by an object 31. The field of view 10 corresponds to the beamwidth of the antenna arrangements 6, 9 in a previously known manner.

The above is repeated as many times as necessary at a predetermined frequency band, while the vehicle moves along the parking spot 13 in the forward direction F, to obtain required information regarding possible parking spots.

Figure 4:
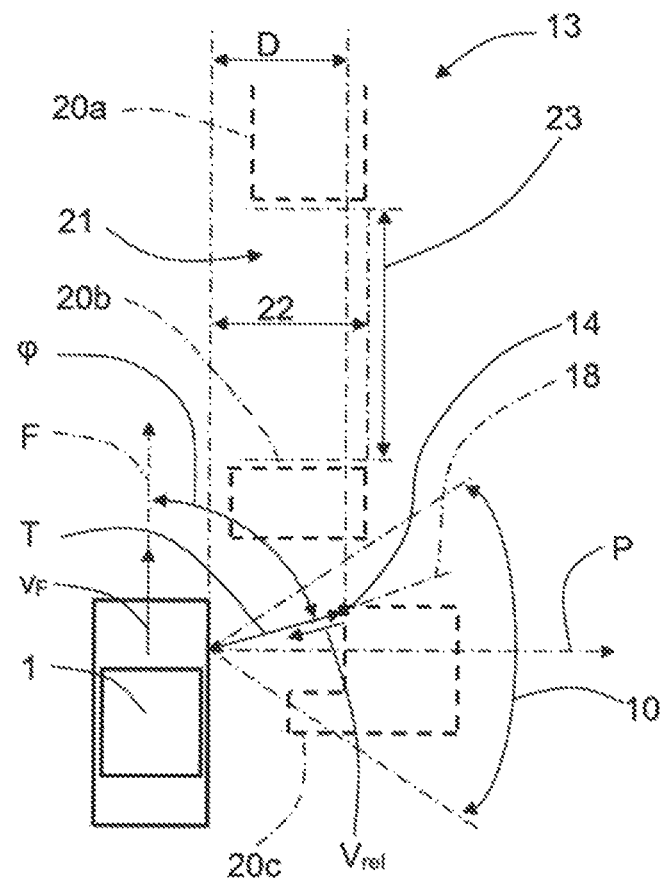
FIG. 4 shows a simplified top view of a vehicle passing a parking space.
Figure 7:
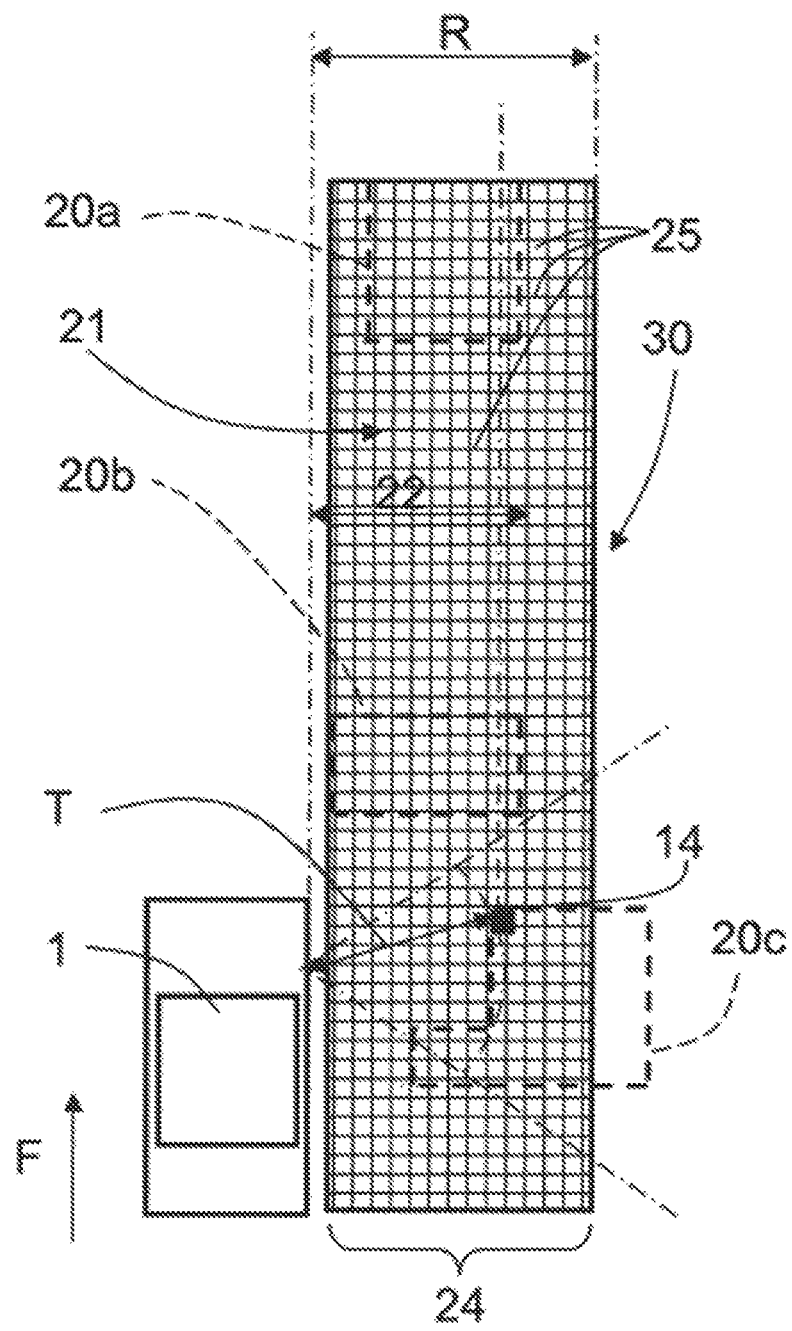
FIG. 7 shows a simplified top view of a vehicle passing a parking space a Cartesian grid for a complete range and angle spectrum is formed.

According to the present disclosure, with reference also to FIG. 4, each measure results in a measuring point 14, where the control unit is arranged to use each measuring point 14 to form a spectrum density map 30, as indicated in FIG. 7, for each radar cycle along the main field of view 10. As the vehicle 1 moves in the forward direction F, the main field of view 10 moves along, and in this manner a complete spectrum density mapping of a certain area is obtained by combining several spectrum density maps from a corresponding plurality of radar cycles. The control unit 15 is thus arranged to combine at least two spectrum density maps to form a combined spectrum density map.

In this context, a radar cycle is one observation phase in which the radar acquires data, processes the date on several signal processing levels and sends out available results. This can be a fixed time interval (i.e. 40 to 60 milliseconds), or it can be a dynamic time interval depending on environment conditions and processing load.

According to some aspects, the spectrum density map 30 includes range and angle spectrum data. Generally, the spectrum density map 30 includes a calculated returned amount of energy from stationary measuring points. The data included in the spectrum density map 30 may be taken from either the range FFT function or the Doppler FFT function.

Each measuring point is thus detected several times as the vehicle 1 moves in the forward direction F during a plurality of sample times, where at each sample time measuring points with the field of view 10 are detected. For each such detection, the position of a measuring point 14 is determined with respect to the vehicle's position by a target distance T, running between the measuring point 14 and the transmitter antenna arrangement, and a target angle φ running between the forward direction F and an extension 18 of the target distance T. As the vehicle approaches a certain measuring point 14, the target angle φ increases.

According to some aspects, a stationary target, such as a measuring point 14, has a relative velocity $v_{rel}$ that is calculated by the control unit 15 as the vehicle velocity $v_F$ times cosine for the target angle φ, i.e. $v_{rel} = v_F * \cos(\varphi)$. From the relative velocity $v_{rel}$ a phase difference α between two adjacent FMCW ramps is calculated by the control unit 15, as will be described below.

Only stationary objects will present the same phase difference α for all ramps r in a radar cycle for a certain target angle φ. For each ramp r, each measurement point results in a complex number that is derived from the range FFT function by means of the control unit 15 and turns with the phase difference α from ramp to ramp. Each complex number includes a phase and a magnitude, where the direction turns with the phase difference α between adjacent ramps. With knowledge of the phase difference α, the control unit 15 is according to some aspects arranged to rotate all measurement vectors for a certain object using the calculated phase difference α such that they are added in phase. This means that consecutive measurements vectors are rotated an integer k times the phase difference α, where the integer k runs from 0 to V−1 where V is the number of measurement vectors.

Figure 6:
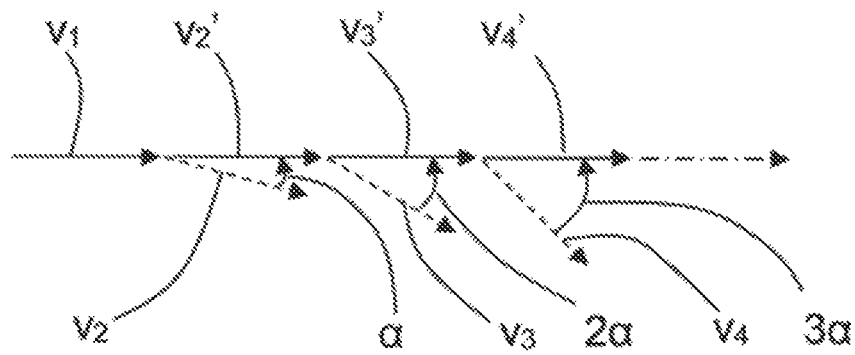
FIG. 6 shows rotated and added measurement vectors.

This is illustrated in FIG. 6, where there is a first vector $v_1$, a second vector $v_2$, a third vector $v_3$ and a fourth vector $v_4$. The first vector $v_1$ is used as a reference vector and is rotated 0°, such that the rotated first vector $v_1$ equals the first vector $v_1$. The second vector $v_2$ has a phase difference α relative the first vector $v_1$ and is rotated back α to form a rotated second vector $v_2'$, the third vector $v_3$ has a phase difference α relative the second vector $v_2$ and is rotated back $2\alpha$ to form a rotated third vector $v_3'$, and the fourth vector $v_4$ has a phase difference α relative the third vector $v_3$ and is rotated back $3\alpha$ to form a rotated fourth vector $v_4'$. The first vector $v_1$ and the rotated vectors $v_2'$, $v_3'$, $v_4'$ all add in phase since the measurement point is stationary. In FIG. 6, only a few vectors are shown for explanatory reasons.

Generally, this means that consecutive measurements vectors $v_1, v_2, v_3, v_4 \ldots v_V$ are rotated an integer k times the phase difference α, where the integer k runs from 0 to V−1 where V is the number of measurement vectors.

In this manner, only stationary objects are considered, moving objects will not result in measurement vectors that add in phase; over time such objects will result in measurement vectors that more or less cancel out, and thus only stationary objects will be considered. This is done for each angle in the acquired range and angle spectrum. For each receive channel, a range and angle spectrum is formed in this manner. In this context, the term "stationary" refers to stationary with respect the vehicle radar system 3.

The phase difference α between adjacent ramps is calculated as $$\alpha = \frac{2\pi}{d_{nyq}} \cdot v_{rel}, \quad (1)$$

where $d_{nyq}$ is the Nyquist distance that is calculated as:

$$d_{nyq} = d_{res} \cdot N \quad (2)$$

where $d_{res}$ is the Doppler resolution that is calculated as:

$$d_{res} = \frac{\frac{c_0}{2}}{\frac{1}{2}(f_{start} + f_{stop}) \cdot T(N-1)}, \quad (3)$$

where $c_0$ is the speed of light in vacuum.

Furthermore, according to some aspects, all receive channels, corresponding to the receiver antenna devices 9a, 9b, 9c, 9d, are combined by means of beamforming.

Figure 5:
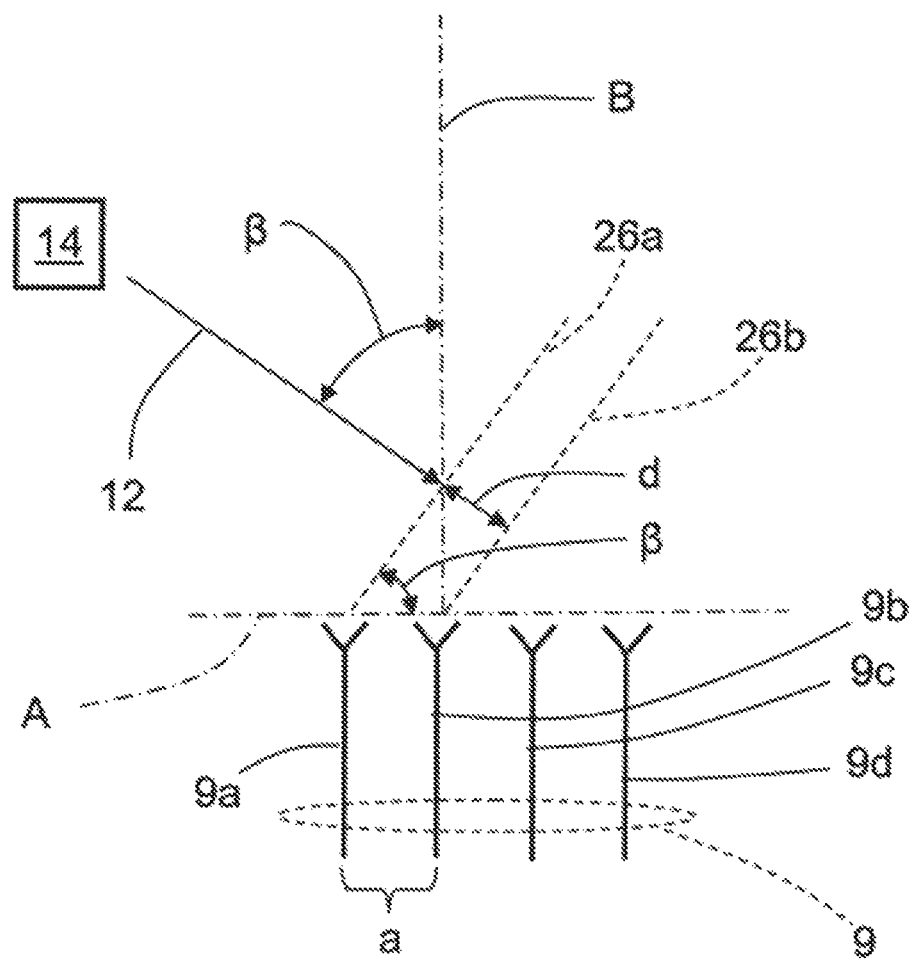
FIG. 5 shows a simplified schematic view of a receiver antenna arrangement.

As illustrated in FIG. 5, the receiver antenna arrangement 9 includes four receiver antenna devices; a first receiver antenna device 9a, a second receiver antenna device 9b, a third receiver antenna device 9c and a fourth receiver antenna device 9d. A reflected signal 12 includes a wavefront that here is illustrated at two times, constituting a first time wavefront 26a and a second time wavefront 26b, the first time wavefront 26a and the second time wavefront 26b thus illustrating the same wavefront at two different times.

There is a receiver antenna aperture plane A and a boresight direction B that runs perpendicular to the receiver antenna aperture plane A. The reflected signal 12 has an inclination β relative the boresight direction B, where the inclination β constitutes a direction of arrival (DOA), β constituting a DOA angle.

The DOA angle β results in that the first time wavefront 26a reaches the first receiver antenna device 9a first, then the second receiver antenna device 9b and so on. There is thus a delay time Δt that occurs between when the first time wavefront 26a reaches the first receiver antenna device 9a and when the second time wavefront 26b reaches the second receiver antenna device 9b, and this delay time Δt corresponds to a certain delay distance d and a certain delay phase ξ, and depends on the DOA angle β.

Since the angle of each stationary measurement point is known, according to some aspects, the delay time Δt is calculated by the control unit 15, and then the corresponding delay phase difference ξ is derived. The calculation is made according to:

$$\xi = \frac{2\pi \cdot a \cdot \sin(\beta)}{\lambda_c}, \quad (4)$$

where a is a distance between the adjacent receiver antenna devices, in FIG. 5 between the first receiver antenna device 9a and the second receiver antenna device 9b, and where $\lambda_c$ is a center frequency wavelength, i.e.

$$\lambda_c = \frac{c_0}{\frac{1}{2}(f_{start} + f_{stop})}. \quad (5)$$

Equation (4) follows from trigonometry in FIG. 5.

The processing is done on all receive channels separately by adding a phase rotation that is introduced due to the Doppler effect, where there is a phase rotation performed for a determined complex signal at a specific antenna. As stationary objects having different angles to the system have different relative velocities, this separates the energy received from objects at different angles.

By means of the present disclosure, as shown in FIG. 7, a complete spectrum density map 30 is acquired in a Cartesian grid 24 that is combined from all cycles during the passing of the main field of view 10 and having a certain depth R, providing a dense estimation of energy returns 14, 25 (only a few indicated in the Figure) instead of single separate detection points. An energy return is any type of received reflection, for example from a measuring point 14. In this way, a two-dimensional detailed top view of the parking spot 13 is obtained, where all energy returns are accounted for.

Suitably, according to some aspects, a camera device and image processing algorithms are used for identification and classification of objects. In FIG. 4 and FIG. 7, three objects 20a, 20b, 20c are shown.

An advantage of keeping all information is that for example a rear light reflector provides a relatively high degree of reflection, but does in itself not provide all data necessary for determining the extension of a vehicle. A radar system that focusses on detections having high degrees of reflection and discards other detections will lose valuable information.

By means of the now acquired range and angle spectrum density map, parking spaces may be detected with a high degree of accuracy, i.e. it may be determined whether there is a useful parking spot 21 available, i.e. a spot which has a sufficient depth 22 and sufficient length 23 admit parking of the vehicle 1.

Figure 3:
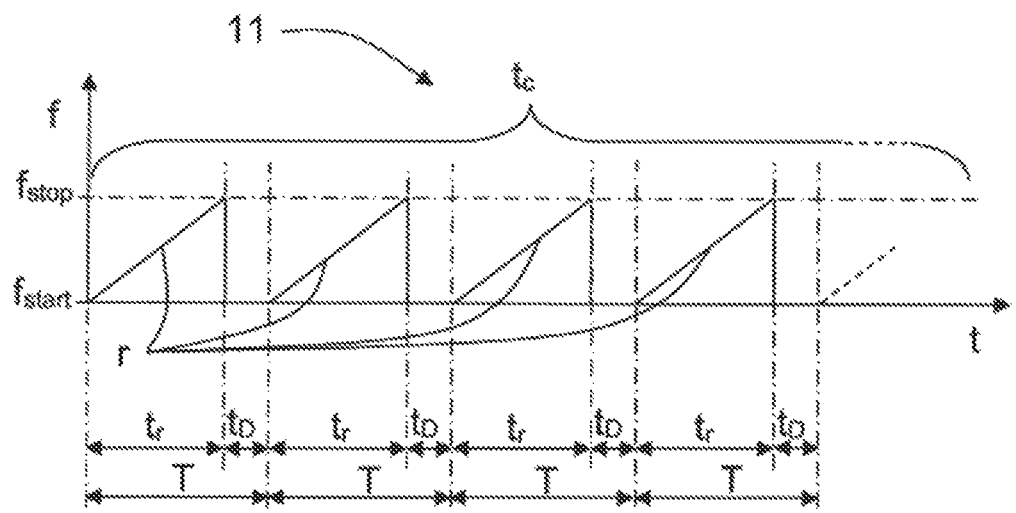
FIG. 3 shows a graphical representation of a chirp signal.

For reasons of clarity, not all measures of FIG. 3 are indicated in FIG. 5.

According to some aspects, there may instead be a forward-looking radar system, or several radar systems covering several fields around the vehicle. Such a coverage is desired for automatic driver assistance systems, where the control and driving of the vehicle 1 is more or less automated.

Figure 8:
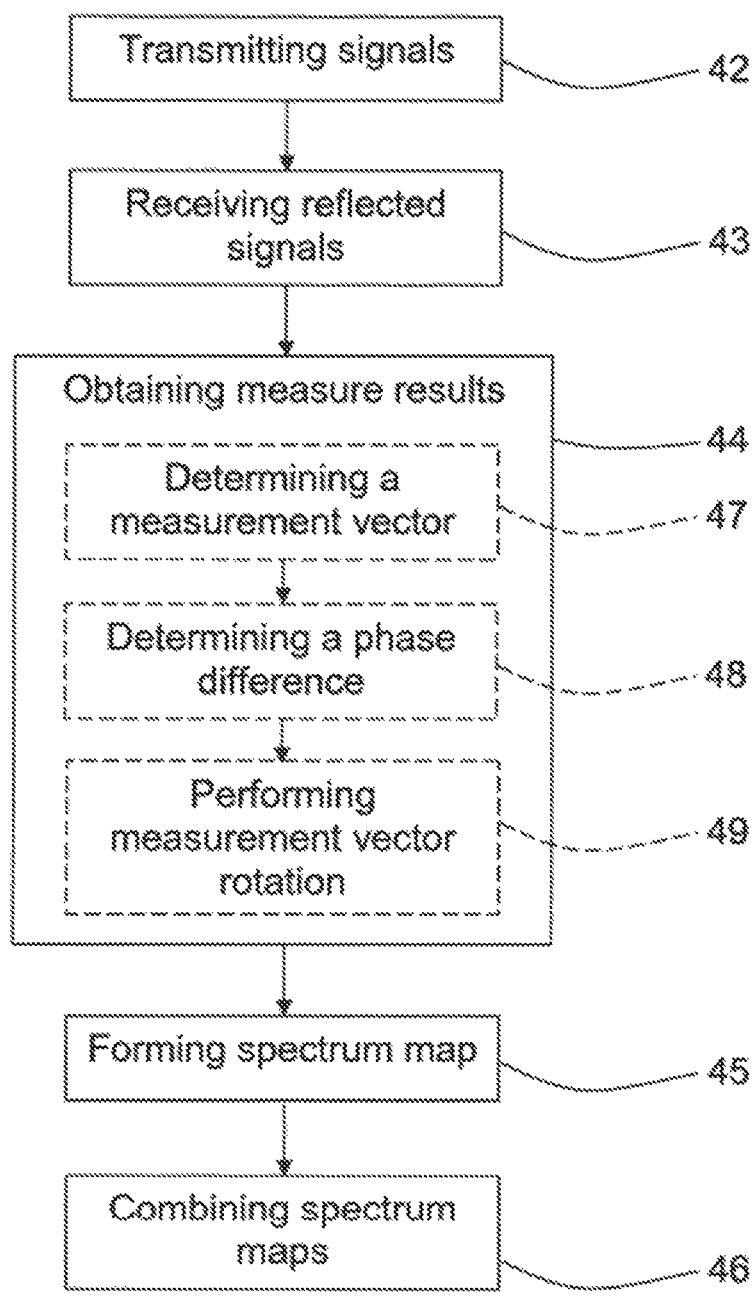
FIG. 8 shows a flowchart for methods according to the present disclosure.

With reference to FIG. 8, the present disclosure also relates to a method for a vehicle Doppler radar system 3 that is used in a vehicle 1 having a forward running direction F. The method includes the steps of:

Step 42: Transmitting signals 11.

Step 43: Receiving reflected signals 12.

Step 44: Obtaining a plurality of measure results from the received reflected signals 12 along a main field of view 10 during at least two radar cycles.

Step 45: For each radar cycle, forming a spectrum density map 30 from measuring points 14 along the main field of view 10, where each measure result results in a measuring point 14.

Step 46: Combining at least two spectrum density maps to form a combined spectrum density map.

According to an example, for each measuring point 14, the method further includes the steps of:

Step 47: Determining a measurement vector $v_1, v_2, v_3, v_4$, including direction and magnitude, for each FMCW ramp r.

Step 48: Determining a phase difference α between adjacent FMCW ramps r.

Step 49: Performing a rotation of measurement vectors $v_1, v_2, v_3, v_4$ using a number of the phase difference α, such that the rotated measurement vectors $v_1', v_2', v_3', v_4'$ that correspond to stationary measuring points 14 add in phase.

The present disclosure is not limited to the examples above, but may vary freely within the scope of the appended claims. For example, the radar system may be implemented in any type of vehicle such as cars, trucks and buses as well as boats and aircraft.

All drawings are simplified, only showing parts that are considered relevant for an adequate description of the present disclosure. It is understood that the general design of radar systems of this kind is well-known in the art.

The constitution of the antenna devices included in the transmitter antenna arrangement 6 and the receiver antenna arrangement 9 may be of any suitable design, such as slot antennas of patch antennas. The transmitter antenna arrangement 6 and receiver antenna arrangement 9 may be combined in one antenna arrangement that is arranged for both transmission and reception by means of, for example, time division multiplexing.

The number of antenna devices included in the transmitter antenna arrangement 6 and the receiver antenna arrangement 9 may vary; there should be at least one transmitter antenna device and at least one receiver antenna device 9a, 9b, 9c, 9d.

Generally, the present disclosure relates to a vehicle FMCW (Frequency Modulated Continuous Wave) Doppler radar system 3 including a transmitter arrangement 4, a receiver arrangement 7 and at least one control unit 15, the radar system 3 being arranged to be mounted in a vehicle 1, where the transmitter arrangement 4 includes a transmitter antenna arrangement 6 arranged for transmitting signals 11, and where the receiver arrangement 7 comprises includes a receiver antenna arrangement 9 arranged for receiving reflected signals 12, the radar system 3 being arranged to obtain a plurality of measure results from the received reflected signals 12 along a main field of view 10 during at least two radar cycles where each radar cycle includes a plurality of FMCW ramps. For each radar cycle, the control unit 15 is arranged to form a spectrum density map 30 from measuring points 14 along the main field of view 10, where each measure result results in a measuring point 14, where the control unit 15 is arranged to combine at least two spectrum density maps to form a combined spectrum density map.

According to an example, each spectrum density map 30 includes range and angle spectrum.

According to an example, the control unit 15 is arranged to calculate each spectrum density map 30 by means of either data from a range FFT (Fast Fourier Transform) function or a Doppler FFT function, where the radar system 3 includes a DSP (Digital Signal Processor) function 39 that is arranged to perform the FFT functions.

According to an example embodiment, the control unit 15 is arranged to determine a phase difference α between adjacent FMCW ramps r for each measuring point 14, to determine a measurement vector $v_1, v_2, v_3, v_4$ including direction and magnitude for each measuring point 14, and to perform a rotation of each measurement vector $v_1, v_2, v_3, v_4$ with the phase difference α such that the rotated measurement vectors $v_1', v_2', v_3', v_4'$ that correspond to stationary measuring points 14 add in phase.

According to an example embodiment, the receiver antenna arrangement 9 includes at least two receiver antenna devices 9a, 9b, 9c, 9d with corresponding receive channels, where the control unit 15 is arranged to combine the receive channels of the receiver antenna devices 9a, 9b, 9c, 9d by means of beamforming, where each wavefront 12a, 12b corresponding to the received reflected signals 12 reach adjacent receiver antenna devices 9a, 9b, 9c, 9d with a delay time Δt that corresponds to a certain delay distance d and a certain delay phase ξ that depends on a direction of arrival DOA angle β, where the control unit 15 is arranged to compensate for the delay phase ξ by means of a compensating rotation of a determined complex signal for each antenna device 9a, 9b, 9c, 9d.

According to an example embodiment, the radar system 3 is arranged to determine whether there is sufficient parking space available.

Generally, the present disclosure also relates to a method for a vehicle FMCW (Frequency Modulated Continuous Wave) Doppler radar system 3 that is used in a vehicle 1, where the method includes the steps of:

Step 42: Transmitting signals 11.

Step 43: Receiving reflected signals 12.

Step 44: Obtaining a plurality of measure results from the received reflected signals 12 along a main field of view 10 during at least two radar cycles.

Step 45: For each radar cycle, forming a spectrum density map 30 from measuring points 14 along the main field of view 10, where each measure result results in a measuring point 14.

Step 46: Combining at least two spectrum density maps to form a combined spectrum density map.

According to an example embodiment, each spectrum density map 30 uses range and angle spectrum.

According to an example embodiment, each spectrum density map 30 is calculated by either using data from a range FFT (Fast Fourier Transform) function or using a Doppler FFT function.

According to an example embodiment, for each measuring point 14, the method further includes the steps of:

Step 47: Determining a measurement vector $v_1$, $v_2$, $v_3$, $v_4$, including direction and magnitude, for each FMCW ramp r.

Step 48: Determining a phase difference α between adjacent FMCW ramps r.

Step 49: Performing a rotation of measurement vectors $v_1$, $v_2$, $v_3$, $v_4$ using a number of the phase difference α, such that the rotated measurement vectors $v_1'$, $v_2'$, $v_3'$, $v_4'$ that correspond to stationary measuring points 14 add in phase.

According to an example embodiment, the radar system 3 uses at least two receiver antenna devices 9a, 9b, 9c, 9d with corresponding receive channels, where the method includes combining the receive channels of the receiver antenna devices 9a, 9b, 9c, 9d using beamforming, where each wavefront 12a, 12b corresponding to the received reflected signals 12 reach adjacent receiver antenna devices 9a, 9b, 9c, 9d with a delay time Δt that corresponds to a certain delay distance d and a certain delay phase that depends on a direction of arrival (DOA) angle β, where the exemplary method further includes compensating for the delay phase by performing a compensating rotation of a determined complex signal for each antenna device 9a, 9b, 9c, 9d.

According to an example, the method includes determining whether there is sufficient parking space available.

While the above description constitutes the preferred embodiment of the present invention, it will be appreciated that the invention is susceptible to modification, variation and change without departing from the proper scope and fair meaning of the accompanying claims.

The invention claimed is:

1. A vehicle FMCW, Doppler radar system comprising, a transmitter arrangement, a receiver arrangement and at least one control unit, the radar system being adapted to be mounted in a vehicle, where the transmitter arrangement includes a transmitter antenna arrangement for transmitting a transmitted signal, and the receiver arrangement includes a receiver antenna arrangement arranged for receiving a reflected signal, the radar system being arranged to obtain a plurality of measure results from a plurality of reflected signals along a main field of view during at least two radar cycles where each of the radar cycles forms a plurality of FMCW ramps, for each of the radar cycles, the control unit is arranged to form a spectrum density map from a plurality of measuring points along the main field of view, where each of the measure results corresponds to a measuring point, and where the control unit is configured to combine at least two of the spectrum density maps to form a combined spectrum density map.

2. A radar system according to claim 1, wherein the spectrum density map includes a range and an angle spectrum.

3. A radar system according to claim 1 further comprising, the control unit is arranged to calculate the spectrum density map by use of data from a range FFT function or a Doppler FFT function, where the radar system includes a DSP function that is arranged to perform the FFT function.

4. A radar system according to claim 1 further comprising, the control unit is arranged to determine a phase difference between adjacent FMCW ramps of the plurality of FMCW ramps for each of the measuring points to determine a measurement vector including a direction and a magnitude for each of the measuring points, and to perform a rotation of each of the measurement vectors such that the rotated measurement vectors each have a same angle.

5. A radar system according to claim 1 further comprising, the receiver antenna arrangement includes at least two receiver antenna devices with corresponding receive channels, where the control unit is arranged to combine the receive channels of the receiver antenna devices by a beamforming, where a wavefront corresponding to the received reflected signals reaches an adjacent of the receiver antenna devices with a delay time that corresponds to a certain delay distance and a certain delay phase that depends on a direction of arrival angle, where the control unit is arranged to compensate for the delay phase by use of a compensating rotation of a determined complex signal for each of the antenna devices.

6. A radar system according to claim 1 further comprising, the radar system is arranged to determine whether there is sufficient parking space available for a vehicle.

7. A method for a vehicle FMCW, Doppler radar system that is for use in a vehicle, where the method comprises the steps of:
   transmitting a plurality of transmitted signals;
   receiving a plurality of reflected signals; and
   obtaining a plurality of measure results from the received reflected signals along a main field of view during at least two radar cycles, where each of the radar cycles forms a plurality of FMCW ramps;
   for each of the radar cycles, forming a spectrum density map from measuring points along the main field of view, where each of the measure results corresponds to a measuring point; and
   combining at least two of the spectrum density maps to form a combined spectrum density map.

8. The method according to claim 7 further comprising, each of the spectrum density maps uses a range and an angle spectrum.

9. The method according to claim 7 further comprising, each of the spectrum density maps is calculated by either using data from a range FFT function or using a Doppler FFT function.

10. The method according to claim 7 further comprising the steps:

determining a measurement vector including a direction and a magnitude for each FMCW ramp of the plurality of FMCW ramps;

determining a phase difference between adjacent FMCW ramps of the plurality of FMCW ramps; and performing a rotation of each of the measurement vectors, such that the rotated measurement vectors each have a same angle.

11. The method according to claim 7 further comprising, providing the radar system with at least two receiver antenna devices with corresponding receive channels, and combining the receive channels of the receiver antenna devices using a beamforming, where a wavefront corresponding to the received reflected signals reach adjacent of the receiver antenna devices with a delay time that corresponds to a certain delay distance and a certain delay phase that depends on a direction of arrival angle, compensating for the delay phase by performing a compensating rotation of a determined complex signal for each of the antenna devices.

12. The method according to claim 7 wherein, the method includes determining whether there is sufficient parking space available for a vehicle.

13. The method according to claim 10, wherein performing the rotation of each of the measurement vectors includes rotating each of the measurement vectors by an integer times a phase difference, and where the integer is an index number of a given one of the measurement vectors having a value between 0 and V-1, where V is the number of measurement vectors.

14. A radar system according to claim 4, wherein performing the rotation of each of the measurement vectors includes rotating a given one of the measurement vectors by an integer times a phase difference, where the integer is an index number of the given one of the measurement vectors having a value between 0 and V-1, where V is the number of measurement vectors.

* * * * *